United States Patent [19]

Yip

[11] Patent Number: 4,516,926
[45] Date of Patent: May 14, 1985

[54] EXTRUSION DIES

[75] Inventor: Shu W. Yip, Hong Kong, Hong Kong

[73] Assignee: Breville Holdings Pty. Limited, New South Wales, Australia

[21] Appl. No.: 513,252

[22] Filed: Jul. 13, 1983

[30] Foreign Application Priority Data

Jul. 26, 1982 [AU] Australia ............................... PF5048

[51] Int. Cl.³ ............................ B29F 3/04; A21C 3/04
[52] U.S. Cl. .................................... 425/464; 425/466; 425/467
[58] Field of Search .............. 425/464, 466, 467, 380, 425/461

[56] References Cited

U.S. PATENT DOCUMENTS

| 1,152,978 | 9/1915 | Royle | 425/192 |
| 1,725,959 | 8/1929 | Heath | 425/467 |
| 3,380,129 | 4/1968 | Magruder | 425/467 |
| 3,533,134 | 10/1970 | Blomqvist | 425/192 R |
| 4,457,685 | 7/1984 | Huang et al. | 425/461 |

FOREIGN PATENT DOCUMENTS 162131   6/1933   Switzerland ........................ 425/464

Primary Examiner—Willard E. Hoag
Attorney, Agent, or Firm—Holman & Stern

[57] ABSTRACT

A die for the extrusion of pasta or other paste-like foodstuff material, which is made up in two parts one being inserted into the other, the two parts between them defining a series of apertures the cross-sectional shape of each of which defines the shape of the extruded material. A portion of each aperture is defined by one of the parts so that when the parts are disassembled the parts of the apertures are readily accessible for cleaning and the removal of unextruded material.

5 Claims, 11 Drawing Figures

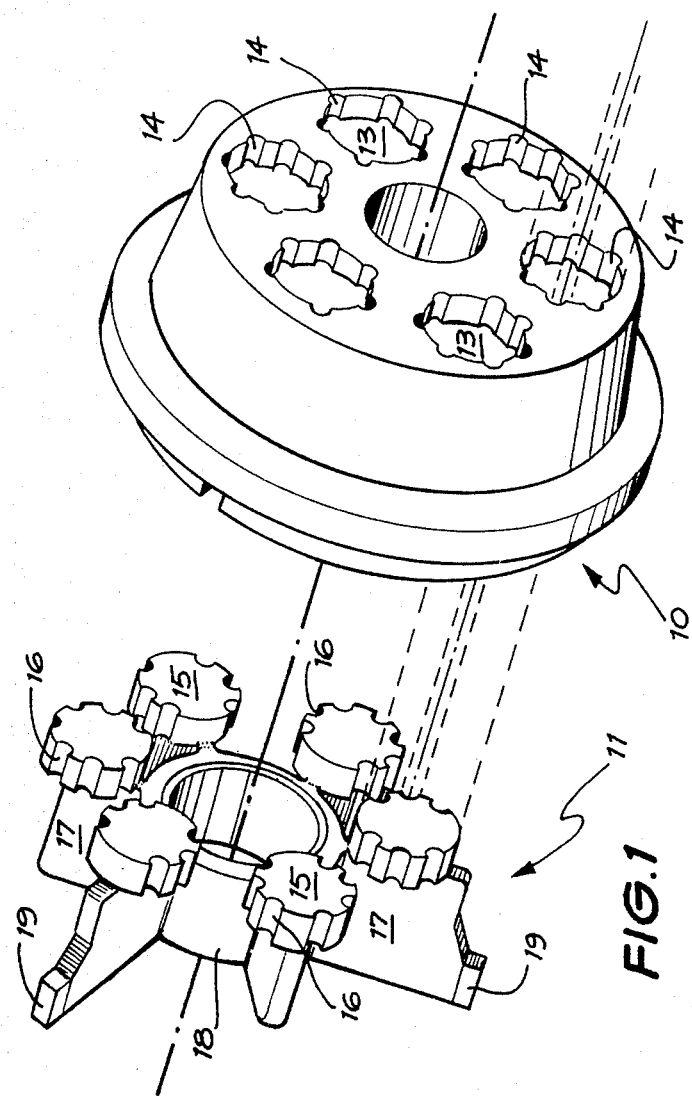

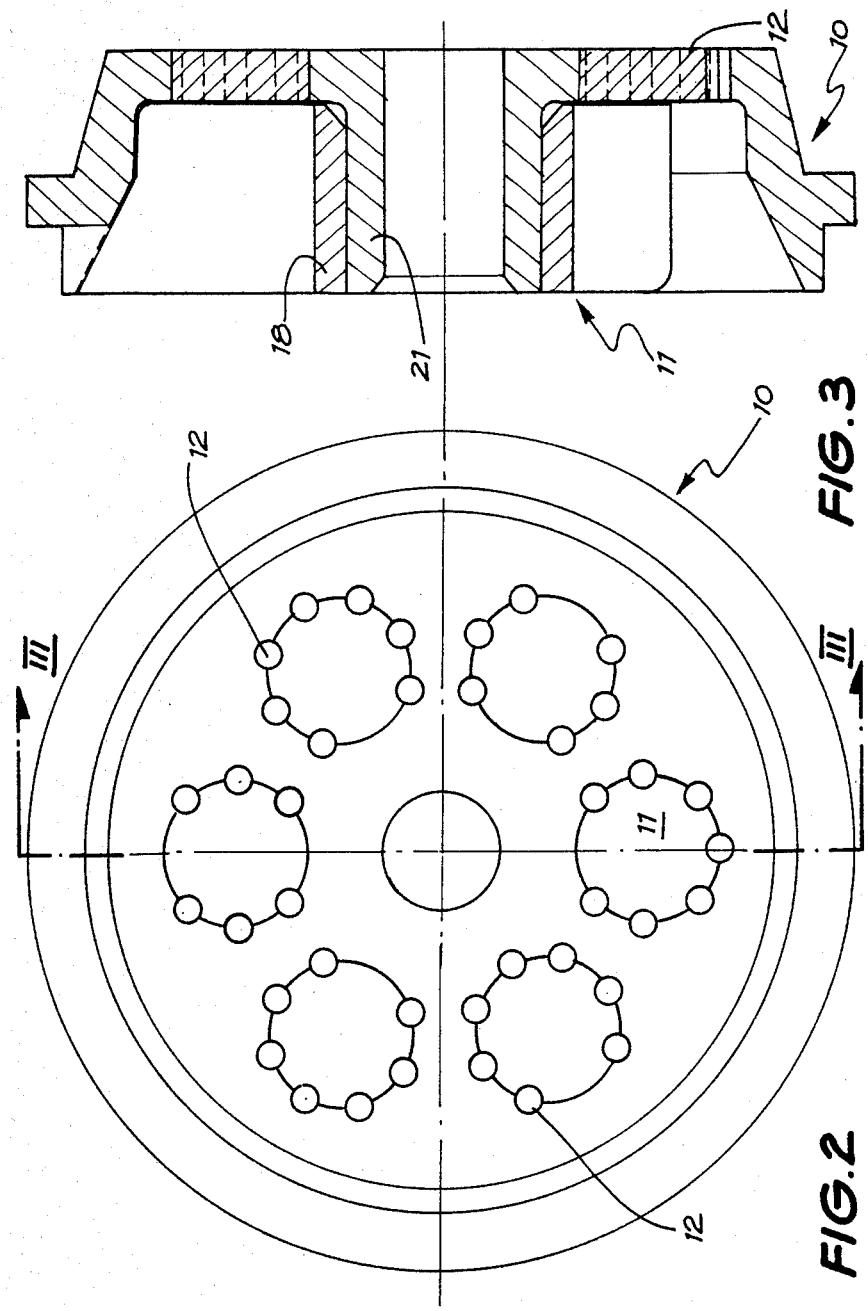

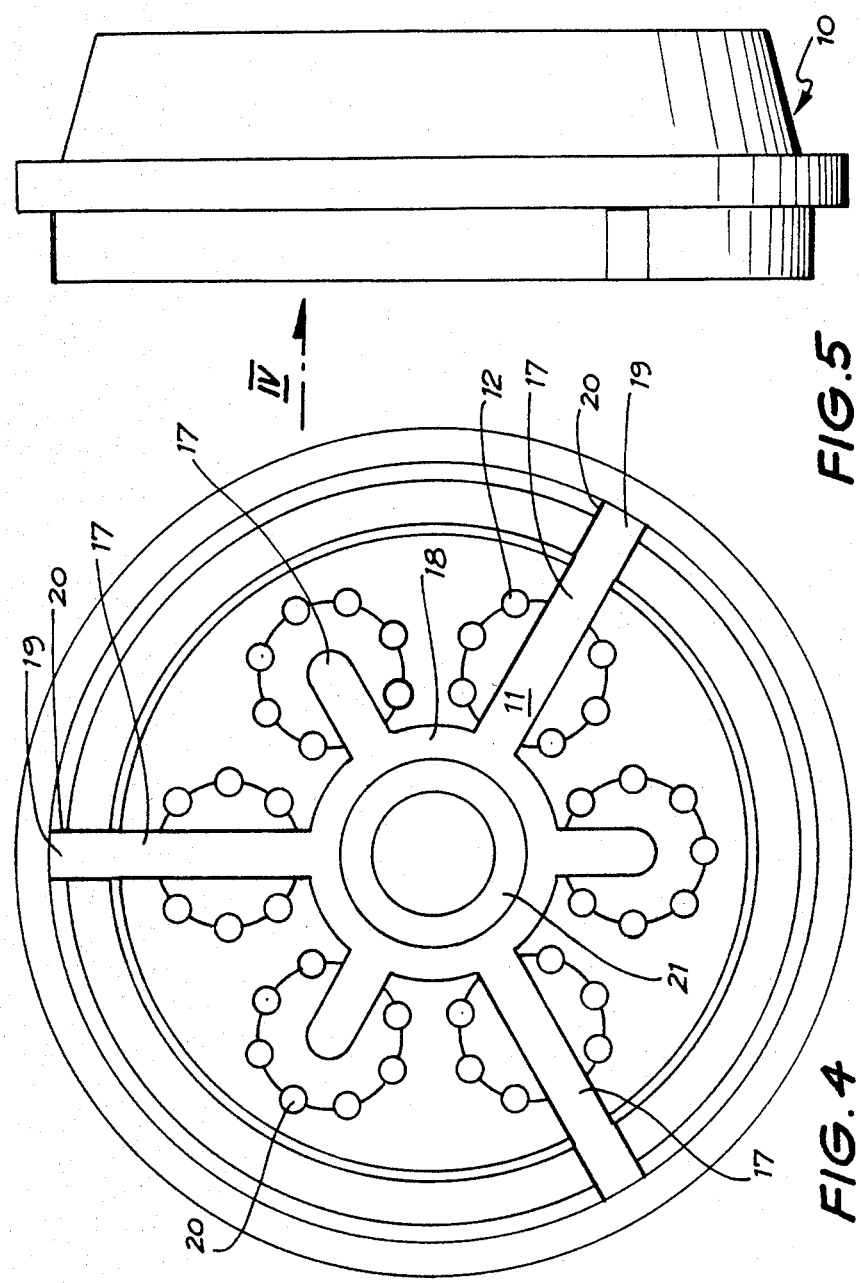

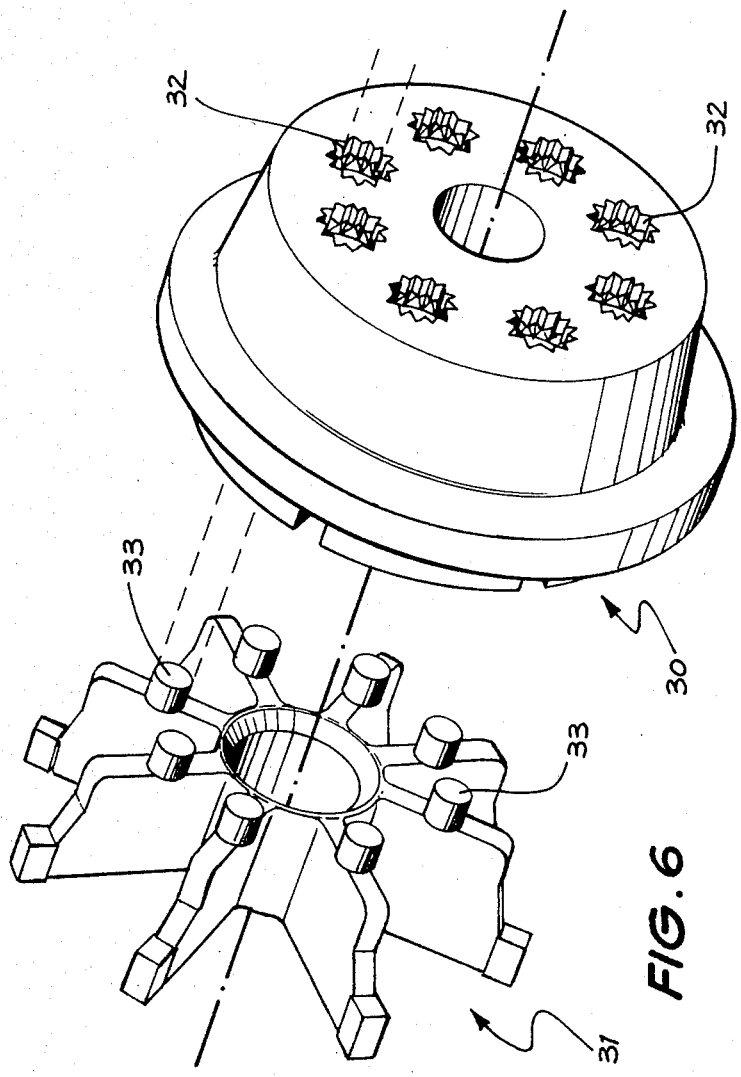

4,516,926

EXTRUSION DIES

BACKGROUND OF THE INVENTION

1. Field of the Invention

The present invention relates to extrusion dies and more particularly to extrusion dies intended for use in the preparation of foodstuffs particularly dies used in pasta making machines.

2. Description of the Prior Art

It is known to make pasta in a range of different shapes such as macaroni, spaghetti and vermicelli some being solid in cross-section and some being hollow in cross-section, by extruding a dough of suitable composition through a die having in it a plurality of apertures each of which corresponds in cross-sectional shape to the cross sectional shape of the particular type of pasta being prepared. While pasta is manufactured commercially on a substantial scale there are on the market machines for the small scale production of fresh pasta for domestic use, which employ extrusion dies such as those described above. A major problem in the use of such machines is in the cleaning of the dies after use. Dies for many forms of pasta necessarily have apertures of small diameter from which it is very difficult to remove dough remaining in the apertures after the extrusion process has been completed. This applies particularly in the case of dies for pasta of tubular section such as macaroni.

BRIEF SUMMARY OF THE INVENTION

The object of the present invention is to provide a die construction that greatly facilitates the cleaning procedure.

The present invention consists in a die for the extrusion of pasta or other paste-like foodstuff material, the die having in it a plurality of apertures each of which defines the cross sectional shape of the extruded material, the die being formed in at least two parts which when assembled together, between them define the apertures in the die, a portion of each aperture being defined by one of said parts, the arrangement being such that on disassembly of said parts the apertures are readily accessible for cleaning.

Dies according to the invention fall into two general categories. One category is for those for the extrusion of solid section material, in which case it is preferred that half of the circumference of each aperture is formed by each of the parts of the die. The second category is that of dies intended for the extrusion of hollow section material, in which case it is preferred that the outer diameter of the aperture is defined by one part and the inner diameter by the other part.

BRIEF DESCRIPTION OF THE DRAWINGS

In order that the invention may be better understood and put into practice preferred forms thereof are hereinafter described by way of example with reference to the accompanying drawings wherein:

FIG. 1 is a perspective exploded view of a die intended for the extrusion of spaghetti;

FIG. 2 is a front view thereof;

FIG. 3 is a cross-sectional view taken on line III—III of FIG. 2;

FIG. 4 is a rear view thereof;

FIG. 5 is a side elevational view thereof;

FIG. 6 is a view similar to FIG. 1 showing a die for use in the production of macaroni.

DETAILED DESCRIPTION

Figure 7:
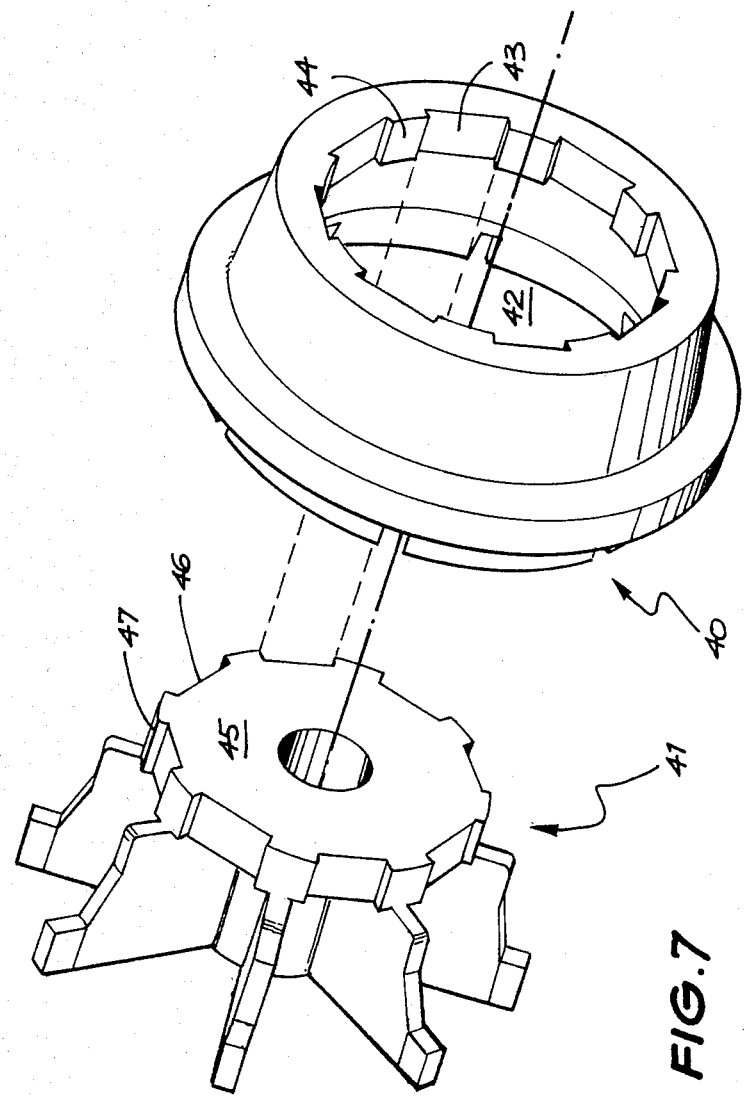
FIGS. 7 to 11 are views similar to FIGS. 1 to 5, respectively, of a die for the extrusion of tagliatelle.

The die shown in FIGS. 1 to 5 is made of steel, brass or suitable plastic material and is made in two parts, the first part consisting of an annulus 10 and the second part of a central insert 11. The annulus 10 is shaped externally to fit into the extrusion machine with which it is to be used in a conventional manner. Parts 10 and 11 between them define a series of apertures 12 each of which is a diameter such as to produce a strand of the kind of pasta known as spaghetti.

The annulus 10 has in its face a series of circumferentially spaced apertures 13 (FIG. 1) each of which has a circular periphery in which are formed a plurality of semi-circular indentations 14.

The insert 11 has on it a plurality of core members 15 circumferentially spaced in the same manner as the apertures 13 and each of these has around its periphery a series of semi-circular indentations 16. When the two parts are assembled together the indentations 16 cooperate with the indentations 14 to produce the extrusion apertures 12. Core members 15 are supported on arms 17 radiating from a central ring 18. Three of the arms 17 are of limited radial extent. The other three however extend to the full internal diameter of the annulus 10 and extensions 19 fit into slots 20 in the annulus 10 when the two parts are assembled. In this condition the ring 18 fits closely around a central annular boss 21 in the annulus 10. This assists in locating the central part of the insert 11. The annular boss 21 has in it a central hole through which the shaft of the extrusion machine passes.

In use the parts of the die are assembled and inserted in the extrusion machine in which the die functions in a conventional manner. After extrusion has been finished the die is removed from the machine and can be readily disassembled as illustrated in FIG. 1. When disassembled the two parts are easily cleaned with a brush and any adhering pasta readily removed. Were the die not capable of being dismantled in this manner it would be extremely difficult to remove pasta from the large number of small holes 12.

When assembled the insert 11 is anchored against rotation relative to the annulus 10 by the extensions 19. The insert 11 is restrained from axial movement in the direction of flow of the pasta by the fact that ring 18 makes contact with the rear face of the front of the annulus 10. Restraint against movement in the other direction is not required as the flow of pasta presses the insert 11 into the annulus 10.

In FIG. 6 there is illustrated a die intended for making the form of pasta known as macaroni. As the construction of this is along lines similar to that of the die shown in FIGS. 1 to 5 it will be described only in those respects in which it differs from that construction. Apertures 32 are provided in the front face of the annulus 30, the interior peripheries of these being dentated for purely decorative purposes. Within the center of each aperture 32 there is a core 33 which, with the aperture 32, defines an annular space by means of which the macaroni is formed. As with the construction previously described, when the die is separated into two parts these are easily cleaned as the apertures 32 like the apertures 13 of the previously described construction are large enough for a brush to be easily inserted.

Figures 8, 9:
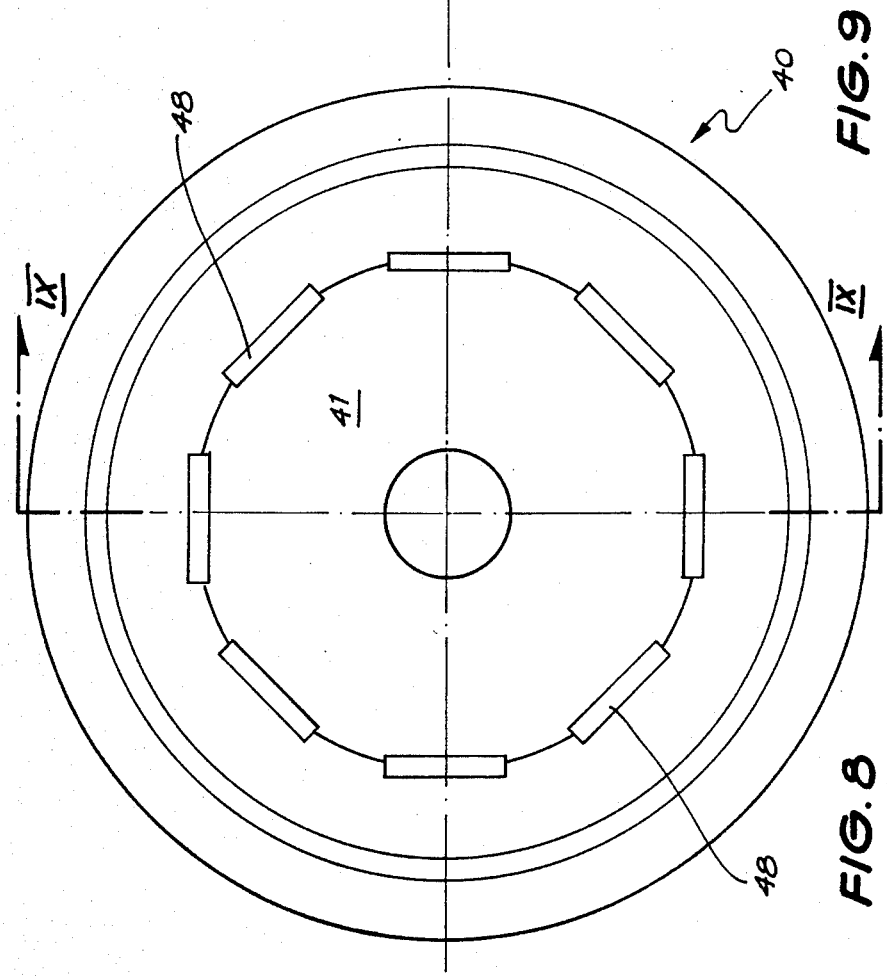
Figures 10, 11:
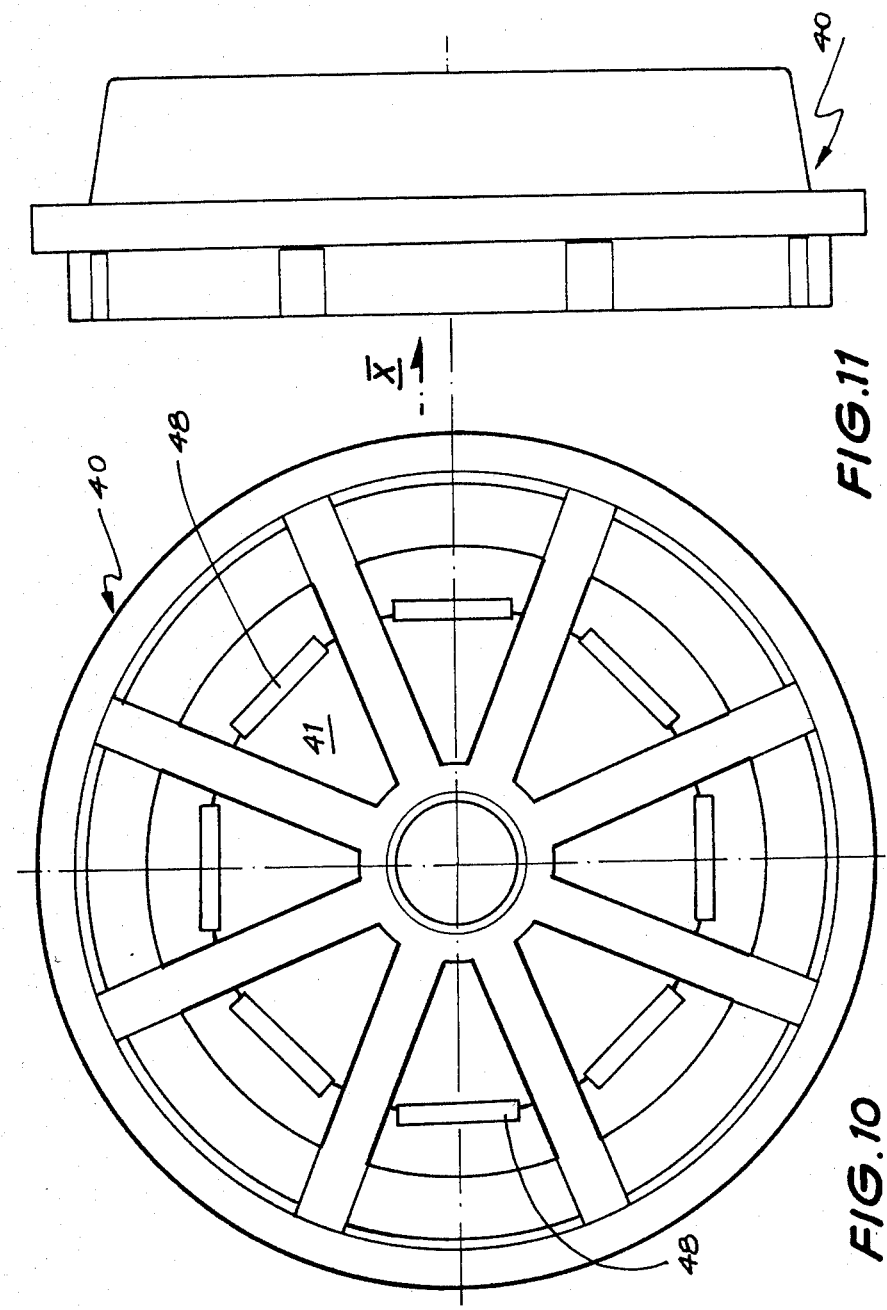

FIGS. 7 to 11 illustrate another form of construction which although constructed along the same general lines as the two dies described above is different in that it is arranged to produce a ribbon like form of pasta known as tagliatelle. Here also the features of construction of the die will be described only insofar as they differ from those of the die shown in FIGS. 1 to 5. In this construction an annulus 40 has in its front wall an opening 42 around the periphery of which are a series of rectangular notches 43 separated by lands 44. The insert 41 has a central boss 45 having on it a similar arrangement of notches 46 and lands 47. When the two parts of the die are fitted together the notches in the two parts combine to form a series of rectangular openings 48 through which the tagliatelle is extruded. As in the other constructions dismantling of the die makes cleaning of the two parts relatively simple.

Whereas the dies described above are intended for particular forms of pasta it will be appreciated by those skilled in the art that similar principles may be applied to the formation of other forms of pasta such as lasagna or vermicelli.

We claim:
1. A two-part extrusion die comprising:
a first member having a substantially flat annular die plate portion, a central annular portion extending perpendicularly from said die plate portion having a central bore extending axially therethrough and extending axially through said die plate portion, a plurality of apertures through said die plate portion circumferentially spaced about said central bore and having axially extending walls, and a plurality of axially extending grooves in said walls; and
a second member having an annular sleeve portion for slidably accommodating said central annular portion of said first member having a bore extending coaxially with said central bore in said first member, radially extending arms extending outwardly from said annular sleeve portion, a plurality of core members attached to said arms corresponding to said apertures through said die plate portion and insertable into said apertures, and a plurality of axially extending grooves in the periphery of each core member for mating with said grooves in said walls of said apertures in said die plate to form extrusion openings arranged in a plurality of discrete groups spaced around said central bore.
2. A two-part extrusion die comprising:
a first member having a substantially flat annular die plate portion, an axially extending peripheral sleeve portion, a radially extending flange extending from said peripheral sleeve portion, a central annular portion extending axially from said substantially flat die plate portion, a plurality of apertures through said die plate portion having axially extending walls, and a plurality of axially extending grooves in said walls; and
a second member having an annular sleeve portion for slidably accommodating said central annular portion of said first member, axially and radially extending portions extending from said annular sleeve portion, core members attached to said axially and radially extending portions, and a plurality of peripheral axially extending grooves in said core members for mating with said grooves in said walls of said apertures in said die plate to form discrete extrusion openings.
3. An extrusion die as claimed in claim 2, wherein each groove of said mating grooves defines approximately half of each discrete opening formed thereby.
4. An extrusion die as claimed in claim 2 wherein:
said apertures are substantially circular; and
said extrusion openings are circular in cross-section.
5. An extrusion die as claimed in claim 2 wherein:
said central annular portion defines a central bore extending axially therethrough and through said die plate portion; and
said plurality of apertures are circumferentially spaced about said central bore, so that said extrusion openings are arranged in a plurality of discrete groups spaced around said central bore.

* * * * *